United States Patent [19]
Dicke et al.

[11] Patent Number: 4,564,669
[45] Date of Patent: Jan. 14, 1986

[54] THERMOTROPIC AROMATIC POLYESTERS HAVING A HIGH TENACITY AND AN IMPROVED MELT VISCOSITY, AND MOULDINGS, FILAMENTS, FIBRES AND FILMS THEREOF

[75] Inventors: Hans-Rudolf Dicke; Manfred Schmidt, both of Krefeld; Aziz El-Sayed, Leverkusen; Ulrich Biskup, Cologne; Ludwig Bottenbruch, Krefeld; Dieter Freitag, Krefeld-Traar, all of Fed. Rep. of Germany

[73] Assignee: Bayer Aktiengesellschaft, Leverkusen-Bayerwerk, Fed. Rep. of Germany

[21] Appl. No.: 627,971

[22] Filed: Jul. 3, 1984

[30] Foreign Application Priority Data

Jul. 16, 1983 [DE] Fed. Rep. of Germany ....... 3325705

[51] Int. Cl.[4] .............................................. C08G 63/60
[52] U.S. Cl. ..................................... 528/173; 528/190; 528/271
[58] Field of Search ......................... 528/173, 190, 271

[56] References Cited

U.S. PATENT DOCUMENTS

| | | | |
|---|---|---|---|
| 4,118,372 | 10/1978 | Schaefgen | 528/190 |
| 4,184,996 | 1/1980 | Calundann | 528/190 |
| 4,188,476 | 2/1980 | Irwin | 528/190 |
| 4,311,824 | 1/1982 | Fayolle | 528/190 |
| 4,375,530 | 3/1983 | Hay | 528/190 |
| 4,487,916 | 12/1984 | Irwin | 528/190 |

Primary Examiner—Lester L. Lee
Attorney, Agent, or Firm—Connolly and Hutz

[57] ABSTRACT

Thermotropic fully aromatic polyesters which contain radicals of p-hydroxybenzoic acid, iso- and/or terephthalic acid and 2,7-dihydroxynaphthalene condensed therein, having outstanding mechanical properties and accordingly are very easy to process.

4 Claims, No Drawings

THERMOTROPIC AROMATIC POLYESTERS HAVING A HIGH TENACITY AND AN IMPROVED MELT VISCOSITY, AND MOULDINGS, FILAMENTS, FIBRES AND FILMS THEREOF

This invention relates to high molecular weight thermotropic fully-aromatic polyesters having a high tenacity and a favourable melt viscosity, to a process for their production and to the use thereof for the production of mouldings, filaments, fibres and films.

The term "thermotropic" denotes those polycondensates which form liquid-crystalline melts. They are well known; see, for example the following publications:

- F. E. McFarlane et al., Liquid Crystal Polymers II, Contemporary Topics in Polymer Science, Vol. 2, Plenum Publishing Corporation, 1977;
- W. J. Jackson and H. F. Kuhfuss, J. Polymer Science, Polymer Chem. Ed. 14 2042 (1976);
- W. C. Wooten et al. in A. Ciferri "Ultra-high Modulus Polymers", Applied Science Publ., London 1979, P. 362 et seq;
- A. Blumstein et al., "Liquid Crystalline Order in Polymers", Academic Press 1978;
- EP 22 344, 26 720, 15 856, 17 310, 15 088, 8 855, WO 79/01034, 79/797 and DE-OS 2,751,653.

The liquid-crystalline condition of the polycondensate melts may be investigated using a polarisation microscope. For the investigations, the eyepiece was fitted with an attachment which contained a photodiode positioned in the focus of the eyepiece lens. Using a measuring amplifier which is connected downstream and has a control device, the measurement value was adjusted to 100 scale divisions on the connected microscope with parallel positioned Nicol prisms, in the absence of a sample material. When the Nicol prisms were crossed a value of 0.01 scale divisions was produced.

The layer thicknesses of the polycondensate melts which were investigated amounted to 100 μm.

The liquid crystalline melts were studied once the samples had been melted at a temperature of from 250° to 400° C. If a liquid crystalline melt is observed in the whole of this region or in a part thereof, the polycondensate is termed thermotropic.

In order to ensure that the optical anisotropy of the melts is to be attributed to a liquid crystalline condition and not, say, to crystals of the polycondensate floating in the melt, the melt was heated to a further 30° C. above the test temperature after the assessment had been made. In so doing, crystals melt down, as a result of which the optical anisotropy of the melt disappears. Only when the lightening in colour of the melt observed between Nicol prisms did not disappear in spite of further heating the melt, the polycondensates were classified as thermotropic. In the measuring equipment, they showed values of above 1 scale division, and for the most part values of from 3 to 90 scale divisions. On the other hand, for amorphous melts, for example aromatic polycarbonates, values of less than 0.1 scale division were found.

The above-described method is particularly suitable for a rapid laboratory determination and produces unequivocal results in practically all cases. However, in cases of doubt, it may be advisable to detect the presence of liquid cyrstalline components in the melt by means of X-ray wide-angle scattering as described, for example by G. W. Gray and P. A. Windsor in "Plastic Crystals, Physico-Chemical Properties and Methods of Investigation", in particular Chapter 3, John Wiley & Sons, New York, Sydney, Toronto 1974.

De-OS 2,025,971 relates to high molecular weight, fully-aromatic polyesters based on p-hydroxybenzoic acid, aromatic dicarboxylic acids (such as terephtalic acid and isophthalic acid) and diphenols (such as hydroquinone or 4,4'dihydoxybiphenyl). These polyesters are thermotropic on account of the components which are used. They may be processed into fibres for example. However, of the 13 polyesters of the Examples, only one melts at a temperature below 300° C. Thus, these polyesters are difficult to process.

EP-PS 1340 relates to fully aromatic thermotropic polyesters which essentially consist of radicals of p-hydroxybenzoic acid, of 2,6-dihydroxynaphthalene and of terephthalic acid which are condensed therein. Our own investigations have shown that these polyesters have a relatively high melt viscosity and a low melt flowability. The tenacity of mouldings produced from these polyesters does not satisfy all requirements.

Thus, an object of the present invention is to provide thermotropic fully-aromatic polyesters which are easier to process compared to the polyesters of DE-OS 2,025,971 and EP-PS 1340, and which still have outstanding mechanical properties.

Another object of the present invention is to provide thermotropic fully-aromatic polyesters which may be processed by thermoplastic shaping to produce mouldings which have a high tenacity.

Surprisingly, it has been found that fully aromatic polyesters which contain radicals of p-hydroxybenzoic acid, iso- and/or terephthalic acid and 2,7-dihydroxy naphthalene condensed therein have the desired combination of advantageous properties.

The present invention provides thermotropic, fully-aromatic polyesters based on (a) (optionally substituted)p-hydroxybenzoic acid;
(b) (optionally substituted)iso- and/or terephthalic acid;
(c) 2,7-dihydroxynaphthalene; and optionally
(d) hydroquinone, resorcinol, bishpenol A, 4,4'-dihydroxydiphenyl, -diphenylether, -diphenylsulphide and/or -diphenylsulphone which may be substituted, and which contain the condensed radicals (a) in quantities of at least 40 mol-%, based on the total of radicals (a), (b), (c) and (d), contain the condensed radicals (c) plus optionally (d) in quantities of from 5 to 30, preferably from 15 to 30, in particular from 20 to 25 mol-%, based on the total of radicals (a), (b), (c) and (d), and contain the condensed radicals (d) in quantities of up to 90, preferably from 10 to 60, in particular from 20 to 35 mol-%, based on the total of radicals (c) and (d), with the limitation that the mol ratio of the condensed radicals b/(c+d) is from 0.95 to 1.05.

Preferred p-hydroxybenzoic acids (a) are p-hydroxybenzoic acids which are substituted in the nucleus by 1 to 2 $C_1$–$C_4$ alkyl, $C_1$–$C_4$ alkoxy, $C_6$–$C_{10}$ aryl or $C_7$–$C_{12}$ alkylaryl (such as phenyl, tolyl and naphthyl), or halogen (preferably chlorine or bromine), for example 4-hydroxy-2-methylbenzoic acid, 4-hydroxy-3-methylbenzoic acid, 2-ethyl-4-hydroxybenzoic acid, 3-ethyl-4-hydroxybenzoic acid, 2- or 3-chloro-4-hydroxybenzoic acid, 4-hydroxy-2-phenylbenzoic acid or 4-hydroxy-3-phenylbenzoic acid, but preferably unsubstituted p-hydroxybenzoic acid itself.

Preferred iso- and terephthalic acids (b) are products which are substituted, as described above for (a), but in particular unsubstituted isophthalic acid and terephthalic acid.

Up to 4 hydrogen atoms of the compounds (d) may be (preferably chlorine and bromine) or phenyl. Preferred compounds (d) are either unsubstituted or substituted by methyl, for example hydroquinone or 3,3',5,5'-tetramethyl-4,4'-dihydroxyphenyl.

The polyesters according to the present invention may contain the radicals of the compounds (a) to (d) in a statistical distribution, in segments or in blocks. It is to be noted with respect to component (a) that relatively long blocks may greatly increase the melting point and the melt viscosity.

The polyesters of this invention may contain —COOH, —H, OH, —OC$_6$H$_5$, acyloxy or radicals originating from chain terminators as end groups. Preferred chain terminators include monofunctional aromatic hydroxyl compounds, such as 4-hydroxydiphenyl, p-nonylphenol 4-(1,1,3,3-tetramethylbutyl)-phenol, β-naphthol, and aromatic monocarboxylic acids, such as diphenylcarboxylic acids and naphthalene carboxylic acids. Chain terminators may be used in quantities of from 0.5 to 5 mol %, based on the sum total of components a and b.

Branching tri- or higher functional, preferably aromatic monomers may optionally also be used in quantities of from 0.1 to 1 mol %, based on the sum total of components a and b, for example phloroglucin, 1,3,5-benzenetricarboxylic acid and 3,5-dihydroxybenzoic acid.

The polyesters according to the present invention usually have an inherent viscosity of at least 0.5, preferably at least 1.0 dl/g (measured on a solution of 5 mg of polyester /ml of p-chlorophenol at 45° C.). If the polyesters are insoluble in p-chlorophenol, it is assumed that they have the specified minimum viscosity. Thus, they correspond to the present invention, as long as they satisfy the parameters of the main claim.

The polyesters of this invention preferably have a melt viscosity of less than 100 Pa.s, measured at a shearing speed of $10^3$ sec$^{-1}$ using a nozzle having a length/diameter ratio of 20 at a temperature of below 340° C., preferably below 310° C.

The polyesters of this invention may be produced according to various processes, for example by the condensation or transesterification of reactive derivatives of compounds (a) to (d), for example the esters or acid chlorides thereof, and by subsequent polycondensation.

Examples of preferred starting compounds are thus the aryl esters, the acyl esters and the acid chlorides of compounds (a) to (d).

According to a preferred synthesis the lower acyl esters, preferably the acetates of compounds (a), (c) and optionally (d) are reacted with iso- and/or terephthalic acid, the acyl esters may also be produced in situ.

The radicals of compounds (a) to (d) are incorporated into the polyester in the ratio of the starting components.

The polyesters of this invention are preferably free of carbonate groups.

It is appropriate to accelerate the condensation or transesterification reactions and the polycondensation reactions by means of a catalyst. Catalysts of this type are known, for example Lewis acids and hydrohalic acids; oxides, hydrides, hydroxides, halides, alcoholates, phenolates, salts or organic or inorganic acids (preferably carboxylic acid salts), complex salts or mixed salts of alkali metals, for example magnesium, and calcium; of Secondary Group elements, for example vanadium, titanium, manganese, cobalt, nickel, zinc, lanthanum, cerium, zirconium or of elements of other groups of the Periodic Table, for example germanium, tin, lead and antimony or the alkali metals or alkaline- earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl–C$_1$–C$_8$–alkoxides, titanium alkoxides such as titanium tetrabutylate, titanium tetrapropylate, alkoxy titanium silicates, zirconium butylate, zirconium propylate, titanium tetraphenolate, sodium phenolate, germanium dioxide, antimony trioxide, dialkyl- and diaryl tin oxide, dibutyl-tin-diacetate, and di-butyl-dimethoxy-tin. Magnesium-, manganese-, sodium-, potassium-, and zinc acetate are particularly preferred.

The quantities of catalyst are preferably from 0.001 to 1, in particular from 0.01 to 0.2% by weight, based on the total weight of monomers which are used.

The polyesters of this invention may be produced at a temperature of from 160° to 370° C., the reaction generally being started at a low temperature which is continuously increased as the reaction proceeds. As the rate of reaction slows down, a vacuum may be applied, in which case the pressure is preferably continuously reduced from normal pressure to about 0.1 mbar.

The product which is obtained may be subjected, preferably in granulate form, to a solid phase secondary condensation under reduced pressure at a temperature of from 200° to 300° C. After from 5 to 25 hours, the molecular weight has increased and the properties of the resulting polyester are markedly improved.

Thus, this invention also provides a process for the production of the new polyesters by reacting components (a) to (c) and optionally (d) or the reactive derivatives thereof which may also be produced in situ, optionally in the presence of chain terminators, branching agents and catalysts, at a temperature of from 160° to 370° C., optionally under reduced pressure.

As a result of their relatively low melt viscosity, the thermotropic polyesters according to the present invention may advantageously be processed from the melt into injection mouldings, filaments, fibres strips and films, a molecular orientation being achieved due to shearing forces which arise, said orientation is greatly influenced by the intensity of the shearing forces. Moreover, the polyesters exhibit a pronounced structural viscosity, i.e. the melt viscosity decreases considerably if the shearing forces increase. Suitable processing methods include injection moulding, extrusion, pressing and melt extrusion.

Mouldings which have a high tensile strength, an extraordinary tenacity and a considerable dimensional stability may be produced from the polyesters of this invention. Since the polyesters are extremely resistant to chemicals and since they have excellent flame resistance, they are preferably suitable for the production of:
  electrotechnical articles, for example insulators, printed circuits, plug contacts, staple parts;
  parts of chemico-technical apparatus, for example pipes, container linings, rotors, sliding bearings, seals;
  parts of aircraft interior fittings; and parts of medico-technical devices, for example constructional parts of air-conditioning plant, and parts of valves.

However, the polyesters of this invention may also be used as covering and coating materials (in powder form or dispersed). They are also most suitable for the production of reinforced or filled moulding compositions having a reinforcer or filler content of from 5 to 65% by weight, based on the reinforced or filled moulding composition.

Thus, the present invention also provides the use of the new polyesters for the production of mouldings, filaments, fibres and films.

The invention is illustrated by the following Examples.

EXAMPLES

The impact strength $a_n$ test and the notched impact strength $a_k$ test were carried out on standard small rods according to DIN 53 453 (ISO/R 179) at 23° C. in each case on 10 test samples. The flexural strength was determined on standard small rods according to DIN 53 452 (ISO/R 178). The bending-E-modulus was determined according to DIN 53 457. The dimensional stability under heat was measured by determining the Vicat-B-softening temperature according to DIN 53 460 (IS 306).

EXAMPLE 1

The following substances were weighed into a 1 liter, surface-ground container provided with a surface-ground lid, a stirrer, a nitrogen inlet and a fractionating column which was connected to a condenser:

297 g   2.15 mols of p-hydroxybenzoic acid;
141.2 g   0.85 mols of terephthalic acid;
136.1 g   0.85 mols of 2,7-dihydroxynaphthalene;
471.7 g   4,6-mols of acetanhydride;
1 g of magnesium; and
0.5 g of antimony(tri)oxide.

The mixture was heated to 170° C. by means of a salt bath under a nitrogen atmosphere. As soon as the distillation of acetic acid slowed down (after about 1 hour), the temperature in the reaction vessel was increased to 250° C. over a period of two hours and then increased to 300° C. over a further two hours period. At the end of the distillation, the pressure was reduced to about 1 mbar.

During this vacuum phase, the viscosity of the resulting polymer melt greatly increased. Therefore, the melt was stirred more slowly.

At the end of this phase, a total quantity of 537 g of acetic acid (contains residual acetanhydride) had been collected.

The resulting light beige polyester was ground and extracted with acetone. The inherent viscosity of the remaining polyester was 1.7 dl/g.

By determining the end groups using infra-red spectroscopy, an average molecular weight $\overline{M}n$ of about 21000 was found.

From DSC analysis (Differential Scanning Calorimetry, heating rate: 20 K/min), a glass temperature of about 130° C. was found. A melt endotherm was not observed.

Comparison

Example 1 was repeated, but the 2,7-dihydroxynaphthalene was replaced by 2,6-dihydroxynaphthalene. For the final condensation, the temperature had to be increased to 330° C.

Glass temperature: 120° C.
Melt endotherm: 300° C.
Molecular weight $\overline{M}n$: 19 000.

The polyesters of Example 1 and of the Comparison were dried under vacuum at 90° C. and injected separately to produce standard small rods.

The polyester of Example 1 was injected at 280° C. mass temperature and the polyester of the Comparison at 300° C. mass temperature.

TABLE 1

|  | Example 1 | Comparison |
|---|---|---|
| Impact strength | 50 kJ/m² | 8.3 kJ/m² |
| Notched impact strength | 30 kJ/m² | 7 kJ/m² |
| Flexural strength | 120 MPa | 98 MPa |
| Bending-E-modulus | 5020 MPa | 6890 MPa |
| Vicat B | 136° C. | 137° C. |
| Melt viscosity (at $10^3$ sec$^{-1}$) | 160 Pa · s (at 280° C.) | 800 Pa · s (at 300° C.) |

EXAMPLE 2

The following substances were weighed into the reaction vessel described in Example 1:

276.2 g   2 mols of p-hydroxybenzoic acid;
166.1 g   1 mols of terephthalic acid;
136.1 g   0.85 mols of 2,7-dihydroxynaphthalene;
16.5 g   0.15 mols of hydroquinone;
490 g   4.8 mols of acetanhydride;
1 g of zinc acetate, and
0.5 g of germanium oxide.

The temperature-time programme described in Example 1 was followed. The final condensation temperature was 290° C. The polyester produced in this manner had a pronounced fibrous structure. The resulting product was extracted with acetone.

Inherent viscosity: 2.13 dl/g.

After drying under vacuum at 90° C., the polyester was processed by injection moulding to produce standard small rods (mass temperature: 285° C.). Table 2 gives the values which were obtained during the technological test.

EXAMPLE 3

The following substances were introduced into the reaction apparatus described in Example 1:

276.2 g   2.0 mols of p-hydroxybenzoic acid,
66.45 g   0.4 mols of terephthalic acid;
99.68 g   0.6 mols of isophthalic acid;
64.05 g   0.4 mols of 2,7-dihydroxynaphthalene;
66.07 g   0.6 mols of hydroquinone;
490 g   4.8 mols of acetanhydride;
0.5 g of titanium tetrabutylate; and
0.5 g of germanium oxide.

The polyester which was produced in analogous manner to that of Example 1 had an inherent viscosity of 1.2 dl/g.

The granulated polyester was post-condensed for 18 hours at 240° C. under vacuum (about 1 mbar). An inherent viscosity of 2.98 dl/g was determined for the product treated in this manner. The test of the technological properties carried out on standard small rods obtained by injection moulding (mass temperature: 290° C.) produced the results listed in Table 2.

TABLE 2

|  | Example 2 | Example 3 |
| --- | --- | --- |
| Impact strength | 54.2 kJ/m$^2$ | 35.7 kJ/m$^2$ |
| Notched impact strength | 31.2 kJ/m$^2$ | 27.3 kJ/m$^2$ |
| Flexural strength | 128 MPa | 111 MPa |
| Bending-E-modulus | 4390 MPa | 4910 MPa |
| Vicat B | 133° C. | 140° C. |
| Melt viscosity (at 10$^3$ sec$^{-1}$) | 210 Pa · s (at 285° C.) | 400 Pa · s (at 290° C.) |

We claim:

1. A thermotropic fully aromatic polyester prepared by reacting
   (a) p-hydroxybenzoic acid or p-hydroxybenzoic acid substituted by one or two of $C_1$–$C_4$ alkyl, $C_1$–$C_4$ alkoxy, $C_6$–$C_{10}$ aryl, $C_7$–$C_{12}$ alkylaryl or halogen;
   (b) isophthalic acid, terephthalic acid, or mixtures thereof which are unsubstituted or substituted by one or two $C_1$–$C_4$ alkyl, $C_1$–$C_4$ alkoxy, $C_6$–$C_{10}$ aryl, $C_7$–$C_{12}$ alkylaryl or halogen;
   (c) 2,7-dihydroxynaphthalene; and
   (d) up to 90 mole-percent based on the total amount of (c) and (d) of unsubstituted or substituted hydroquinone, resorcinol, bisphenol A, 4,4′-dihydroxydiphenyl, 4,4′-diphenylether, 4,4′-diphenylsulphide, 4,4′-diphenylsulphone or mixtures thereof and when substituted are substituted by up to four of halogen, phenyl or methyl; which polyesters contain the condensed radicals (a) in quantities of at least 40 mole-percent, based on the total of radicals (a), (b), (c) and (d), contain the condensed radicals (c) plus (d) in quantities of from 5 to 30 mole-percent, based on the total of radicals (a), (b), (c) and (d), with the limitation that the mol ratio of the condensed radicals b/(c+d) is from 0.95 to 1.05.

2. A polyester according to claim 1, characterized in that the polyester contains the condensed radicals (c) plus (d) in quantities of from 15 to 30 mole-percent, based on the total of components (a), (b), (c) and (d), and contains the condensed radicals (d) in quantities of from 10 to 60 mole-percent, based on the total of components (c) and (d).

3. A polyester according to claim 1, characterized in that the polyester contains the condensed radicals (c) plus (d) in quantities of from 20 to 25 mole-percent, based on the total of components (a), (b), (c) and (d), and contains the condensed radicals (d) in quantities of from 20 to 35 mole-percent, based on the total of components (c) and (d).

4. A polyester article selected from the group of a molded article, a filament, a fiber or a film, fabricated from the polyester of claim 1.

* * * * *